(12) United States Patent
Peng et al.

(10) Patent No.: US 10,435,288 B2
(45) Date of Patent: Oct. 8, 2019

(54) LIQUID VOLUME TRANSFER SYSTEM, LIQUID INFUSION DEVICE, UNMANNED AERIAL VEHICLE AND LIQUID CONTAINER

(71) Applicant: GUANGZHOU XAIRCRAFT TECHNOLOGY CO., LTD., Guangdong (CN)

(72) Inventors: Bin Peng, Guangdong (CN); Dengfeng Li, Guangdong (CN)

(73) Assignee: GUANGZHOU XAIRCRAFT TECHNOLOGY CO., LTD., Guangdong (CN)

( * ) Notice: Subject to any disclaimer, the term of this patent is extended or adjusted under 35 U.S.C. 154(b) by 28 days.

(21) Appl. No.: 15/555,739

(22) PCT Filed: Apr. 17, 2017

(86) PCT No.: PCT/CN2017/080827
§ 371 (c)(1),
(2) Date: Sep. 5, 2017

(87) PCT Pub. No.: WO2017/181929
PCT Pub. Date: Oct. 26, 2017

(65) Prior Publication Data
US 2018/0111817 A1  Apr. 26, 2018

(30) Foreign Application Priority Data

Apr. 18, 2016 (CN) .......................... 2016 1 0241298
Apr. 18, 2016 (CN) ...................... 2016 2 0328196 U (51) Int. Cl.
*B67D 7/22* (2010.01)
*B64C 39/02* (2006.01)
(Continued)

(52) U.S. Cl.
CPC .............. *B67D 7/221* (2013.01); *B64C 39/024* (2013.01); *B64D 1/18* (2013.01); *B67D 7/02* (2013.01);
(Continued)

(58) Field of Classification Search
CPC .......... B67D 7/221; B67D 7/302; B67D 7/02; B67D 2007/329; G01F 22/00;
(Continued)

(56) References Cited

U.S. PATENT DOCUMENTS 5,499,784 A * 3/1996 Crabere ................. B64D 39/00
                                                     244/135 A
8,844,583 B2 * 9/2014 French ................. B64D 37/005
                                                         137/266
(Continued)

FOREIGN PATENT DOCUMENTS

CN  103523733 A   1/2014
CN  105197245 A  12/2015
(Continued)

OTHER PUBLICATIONS

Office Action dated Sep. 27, 2018 for corresponding Japanese Application No. 2017567227.
(Continued)

*Primary Examiner* — David P Angwin
*Assistant Examiner* — Bob Zadeh
(74) *Attorney, Agent, or Firm* — David D. Brush; Westman, Champlin & Koehler, P.A.

(57) ABSTRACT

A liquid volume transfer system includes: a liquid infusion device, including a first communication module, a first controller and a first flow rate detecting module; a liquid container, including a second communication module; and an unmanned aerial vehicle, including a third communication module, a third controller and a second flow rate (Continued)

detecting module. The first controller obtains a remaining liquid volume value from the second communication module through the first communication module, and determines a target infused liquid volume value based on the remaining liquid volume value and a total infused liquid volume value; after completion of infusion, the total infused liquid volume value is sent to the second communication module through the first communication module; the third controller obtains the total infused liquid volume value through the third communication module, and sends the remaining liquid volume value to the second communication module through the third communication module after spraying.

13 Claims, 3 Drawing Sheets

(51) Int. Cl.
| | | |
|---|---|---|
| | *B64D 1/18* | (2006.01) |
| | *B67D 7/02* | (2010.01) |
| | *B67D 7/30* | (2010.01) |
| | *G01F 13/00* | (2006.01) |
| | *G01F 22/00* | (2006.01) |
| | *H04Q 9/00* | (2006.01) |
| | *B67D 7/32* | (2010.01) |

(52) U.S. Cl.
CPC ........... *B67D 7/302* (2013.01); *G01F 13/006* (2013.01); *G01F 22/00* (2013.01); *H04Q 9/00* (2013.01); *B64C 2201/12* (2013.01); *B67D 2007/329* (2013.01); *H04Q 2209/43* (2013.01); *H04Q 2209/47* (2013.01)

(58) Field of Classification Search
CPC .... G01F 13/006; H04Q 9/00; H04Q 2209/47; H04Q 2209/43; B64D 1/18; B64D 39/00; B64C 2201/12; B64C 39/024; B64F 1/28
See application file for complete search history.

(56) References Cited

U.S. PATENT DOCUMENTS

| | | | | |
|---|---|---|---|---|
| 2003/0136874 A1* | 7/2003 | Gjerdrum | ............... | B64D 39/00 |
| | | | | 244/10 |
| 2006/0260826 A1 | 11/2006 | Hutter et al. | | |
| 2007/0102583 A1* | 5/2007 | Cutler | ................... | B64D 39/04 |
| | | | | 244/135 A |
| 2010/0072320 A1* | 3/2010 | Bartov | ................... | B64D 39/02 |
| | | | | 244/135 A |
| 2012/0273619 A1* | 11/2012 | Tichborne | .............. | B64D 39/00 |
| | | | | 244/135 A |
| 2013/0119202 A1* | 5/2013 | French | ................... | B64D 37/16 |
| | | | | 244/135 A |
| 2013/0126676 A1* | 5/2013 | Travers | .................. | B64D 37/16 |
| | | | | 244/135 A |
| 2013/0168497 A1* | 7/2013 | Rix | ......................... | B64D 39/00 |
| | | | | 244/135 A |
| 2014/0319181 A1* | 10/2014 | Tremel | ............... | B65D 83/0094 |
| | | | | 222/389 |
| 2014/0326752 A1* | 11/2014 | Chesterfield | .............. | B05B 9/03 |
| | | | | 222/131 |
| 2018/0111817 A1* | 4/2018 | Peng | ..................... | B64C 39/024 |

FOREIGN PATENT DOCUMENTS

| | | | | |
|---|---|---|---|---|
| CN | 205131718 U | 4/2016 | | |
| CN | 105711869 A | 6/2016 | | |
| CN | 205554679 U | 9/2016 | | |
| EP | 2942288 A1 | 11/2015 | | |
| JP | H1191889 A | 4/1999 | | |
| JP | 2009179275 A | 8/2009 | | |
| JP | 2013082441 A | * 5/2013 | ............... | B64F 1/28 |
| JP | 2013082441 A | 5/2013 | | |
| KR | 20110018817 A | 2/2011 | | |

OTHER PUBLICATIONS

International Search Report and Written Opinion dated Jun. 30, 2017 for corresponding International Application No. PCT/CN2017/080827, filed Apr. 17, 2017.
English translation of Office Action dated Apr. 22, 2019 for corresponding Korean Application No. 10-2017-7032753.

* cited by examiner

LIQUID VOLUME TRANSFER SYSTEM, LIQUID INFUSION DEVICE, UNMANNED AERIAL VEHICLE AND LIQUID CONTAINER

CROSS-REFERENCE TO RELATED APPLICATION

The present application is a national phase entry under 35 USC § 371 of International Application PCT/CN2017/080827, filed Apr. 17, 2017, which claims the benefit of and priority to Chinese Patent Application No. 201610241298.4, filed Apr. 18, 2016 and No. 201620328196.1 filed Apr. 18, 2016, the entire disclosures of which are incorporated herein by reference.

FIELD

The present disclosure relates to a technical field of unmanned aerial vehicles, and particularly, to a liquid volume transfer system, a liquid infusion device, an unmanned aerial vehicle, and a liquid container.

BACKGROUND

The unmanned aerial vehicle is able to automatically sow seeds, apply fertilizers, and perform plant-protection spraying operations. When used in plant-protection spraying operation, since the unmanned aerial vehicle is limited to its own battery capacity, certain pesticide liquid may remain in a pesticide tank after the plant-protection operation is completed, and the remaining pesticide liquid in the pesticide tank may affect accuracy of infusing the pesticide tank at the next operation, thereby reducing operation efficiency of the whole vehicle.

SUMMARY

The present disclosure provides a liquid volume transfer system, a liquid infusion device, an unmanned aerial vehicle, and a liquid container.

The present disclosure discloses a liquid volume transfer system, which includes: a liquid infusion device, including a first communication module, a first controller and a first flow rate detecting module; a liquid container, including a second communication module; and an unmanned aerial vehicle, including a third communication module, a third controller and a second flow rate detecting module. The first controller obtains a remaining liquid volume value from the second communication module through the first communication module, and determines a target infused liquid volume value based on the remaining liquid volume value and a total infused liquid volume value; the first controller receives a first flow rate signal output by the first flow rate detecting module, calculates a liquid volume infused into the liquid container according to the first flow rate signal, stops a liquid infusion operation when the liquid volume infused into the liquid container reaches the target infused liquid volume value, and sends the total infused liquid volume value to the second communication module through the first communication module; the second communication module receives the total infused liquid volume value sent by the first communication module; the third controller obtains the total infused liquid volume value from the second communication module through the third communication module, receives a second flow rate signal output by the second flow rate detecting module in real time, and determines a sprayed liquid volume value according to the received second flow rate signal after the completion of spraying; the third controller determines the remaining liquid volume value based on the total infused liquid volume value and the sprayed liquid volume value, and sends the remaining liquid volume value to the second communication module through the third communication module; the second communication module receives the remaining liquid volume value sent by the third communication module.

In another embodiment, the liquid infusion device further includes a display module; the first controller controls the display module to display the remaining liquid volume value after acquisition of the remaining liquid volume value; the first controller determines the target infused liquid volume value based on the remaining liquid volume value and the total infused liquid volume value, after receiving a confirmation instruction through the display module.

In another embodiment, the liquid infusion device further includes a weight sensor; the weigh sensor senses a first weight of the liquid container at present; the first controller obtains the first weight, a net weight of the liquid container and a density of the liquid, and determines a second weight of the liquid container at present based on the obtained remaining liquid volume value, the net weight of the liquid container and the density of the liquid; the first controller determines whether the remaining liquid volume value is valid according to the first weight and the second weight, if valid, the remaining liquid volume value is corrected.

In another embodiment, the first communication module and third communication module each are configured as a near field communication (NFC) card reader, and the second communication module is configured as an NFC tag matching the NFC card reader.

In another embodiment, the first communication module and the third communication module each are configured as a Bluetooth wireless transceiver, and the second communication module comprises a memory, a second controller and a Bluetooth wireless transceiver.

The present disclosure discloses a liquid infusion device, which includes: a first communication module, a first controller and a first flow rate detecting module; when a liquid infusion operation is performed on a liquid container, the first controller obtains a remaining liquid volume value from a second communication module in the liquid container through the first communication module, and determines a target infused liquid volume value based on the remaining liquid volume value and a total infused liquid volume value; the first controller receives a first flow rate signal output by the first flow rate detecting module, and calculates a liquid volume infused into the liquid container according to the first flow rate signal; when the liquid volume infused into the liquid container reaches the target infused liquid volume value, the liquid infusion operation is stopped; the first controller sends the total infused liquid volume value to the second communication module through the first communication module.

In another embodiment, the liquid infusion device further includes a display module; the first controller controls the display module to display the remaining liquid volume value after acquisition of the remaining liquid volume value; the first controller determines the target infused liquid volume value based on the remaining liquid volume value and the total infused liquid volume value after receiving a confirmation instruction through the display module.

In another embodiment, the liquid infusion device further includes a weight sensor; the weigh sensor senses a first weight of the liquid container at present; the first controller obtains the first weight, and determines a second weight of the liquid container at present based on the obtained remaining liquid volume value, a net weight of the liquid container and a density of the liquid; the first controller determines whether the remaining liquid volume value is valid according to the first weight and the second weight, if valid, the remaining liquid volume value is corrected.

In another embodiment, when the remaining liquid volume value is valid, the first controller corrects the remaining liquid volume value based on the first weight and the second weight.

In another embodiment, the first communication module is configured as an NFC card reader or a Bluetooth wireless transceiver.

The present disclosure discloses a unmanned aerial vehicle, which includes: a third communication module, a third controller and a second flow rate detecting module; the third controller obtains a total infused liquid volume value from a second communication module provided in a liquid container through the third communication module; the second flow rate detecting module generates a second flow rate signal based on a spray flow rate; the third controller receives the second flow rate signal output by the second flow rate detecting module in real time, and determines a sprayed liquid volume value according to the received second flow rate signal after the completion of spraying; the third controller determines a remaining liquid volume value based on the total infused liquid volume value and the sprayed liquid volume value, and sends the remaining liquid volume value to the second communication module through the third communication module.

In another embodiment, the third communication module is configured as an NFC card reader or a Bluetooth wireless transceiver.

The present disclosure finally discloses a liquid container, which includes a second communication module; the second communication module sends a remaining liquid volume value to a first communication module in a liquid infusion device, such that a first controller in the liquid infusion device may determine a target infused liquid volume value based on the remaining liquid volume value and a total infused liquid volume value; the second communication module receives the total infused liquid volume value sent by the first communication module; the second communication module receives a request sent by a third communication module in an unmanned aerial vehicle for obtaining the total infused liquid volume value, and sends the total infused liquid volume value to the third communication module; the second communication module receives the remaining liquid volume value sent by the third communication module after the completion of spraying.

In another embodiment, the second communication module is configured as an NFC tag matching an NFC card reader.

In another embodiment, the second communication module includes a memory, a second controller and a Bluetooth wireless transceiver.

DETAILED DESCRIPTION

The foregoing objectives, features and advantages of the present disclosure will become more apparent from the following detailed description with reference to the accompanying drawings and specific embodiments.

Figure 1:
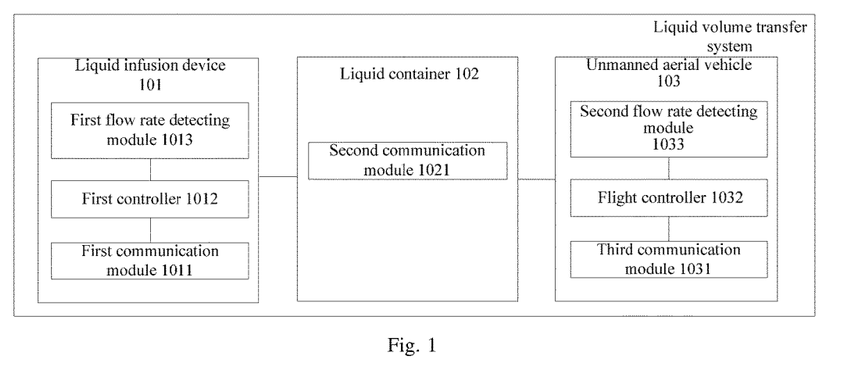
FIG. 1 is a structure chart of a liquid volume transfer system according to an embodiment of the present disclosure.

Referring to FIG. 1, a structure chart of a liquid volume transfer system according to an embodiment of the present disclosure is shown.

The liquid volume transfer system according to this embodiment of the present disclosure includes: a liquid infusion device 101, a liquid container 102 and an unmanned aerial vehicle 103.

The liquid infusion device 101 includes a first communication module 1011, a first controller 1012 and a first flow rate detecting module 1013; the liquid container 102 includes a second communication module 1021; the unmanned aerial vehicle 103 includes a third communication module 1031, a third controller 1032 and a second flow rate detecting module 1033.

The first controller 1012 can obtain a remaining liquid volume value from the second communication module 1021 through the first communication module 1011, and determine a target infused liquid volume value based on the remaining liquid volume value and a total infused liquid volume value. Upon the determination of the target infused liquid volume value, the first controller 1012 can start an operation of infusing liquid into the liquid container.

In the process of infusing liquid into the liquid container, the first controller 1012 can receive a first flow rate signal output by the first flow rate detecting module 1013, and calculate a liquid volume infused into the liquid container according to the first flow rate signal. The first flow rate signal can reflect a flow rate of liquid per unit time, and the liquid volume infused into the liquid container may be determined based on the flow rate of liquid per unit time and the infusion time. When the liquid volume infused into the liquid container 102 reaches the target infused liquid volume value, the liquid infusion operation can be stopped.

The first controller 1012 can send the total infused liquid volume value to the second communication module 1021 through the first communication module 1011. The second communication module 1021 can receive the total infused liquid volume value sent by the first communication module 1011 and store the total infused liquid volume value.

When the liquid container 102 is combined with the unmanned aerial vehicle 103, that is, when the liquid container 102 is placed at a predetermined position of the unmanned aerial vehicle 103, the third controller 1032 provided in the unmanned aerial vehicle 103 can obtain the total infused liquid volume value from the second communication module 1021 through the third communication module 1031.

After acquisition of the total infused liquid volume value, the third controller 1032 can control a liquid spraying component to spray the liquid, and the second flow rate detecting module 1033 can output a second flow rate signal in real time in a liquid spraying process. The third controller 1032 can receive the second flow rate signal output by the second flow rate detecting module in real time, and determine the sprayed liquid volume value according to the received second flow rate signal after the completion of spraying.

The second flow rate signal can reflect a flow rate of liquid per unit time, and the sprayed liquid volume value during this operation may be determined based on the flow rate of liquid per unit time and the total time of liquid spraying.

The third controller 1032 can determine the remaining liquid volume value based on the total infused liquid volume value and the sprayed liquid volume value, and send the remaining liquid volume value to the second communication module 1021 through the third communication module 1031; the second communication module 1021 can receive the remaining liquid volume value sent by the third communication module 1031, such that before the next operation, the liquid infusion device may obtain the remaining liquid volume value in the liquid container during this operation from the second communication module 1021.

It should be noted that the liquid volume transfer system may be used to infuse and spray any suitable liquid, such as pesticides, liquid fertilizers and so on. Correspondingly, the liquid infusion device and the liquid container need to be adapted to different types of liquid to be infused and sprayed; for example, when spraying pesticides, the liquid infusion device can be a pesticide infusion device, and the liquid container can be a pesticide tank.

It should be noted that the third controller according to this and the following embodiments of the present disclosure may be a flight controller, a spray controller, or other controllers capable of implementing the functions described in the present disclosure.

For the liquid volume transfer system according to the embodiment of the present disclosure, the liquid infusion device, the liquid container and the unmanned aerial vehicle are each provided with a communication module, and through communication among three communication modules, the total infused liquid volume value actually infused into the liquid container is transmitted to the third controller; after this operation is completed, the third controller determines the remaining liquid volume value based on the total infused liquid volume value and the actually sprayed liquid volume value during this operation, and sends the remaining liquid volume value or the remaining pesticide volume information back to the liquid infusion device through the communication among the communication modules. After the liquid infusion device obtains the remaining liquid volume value, the target infused liquid volume value may be determined automatically based on the remaining liquid volume value, and the liquid infusion operation may be executed under automatic control based on the target infused liquid volume value, so as to achieve the purpose of automatic and accurate liquid infusion, thereby improving the operation efficiency.

Figure 2:
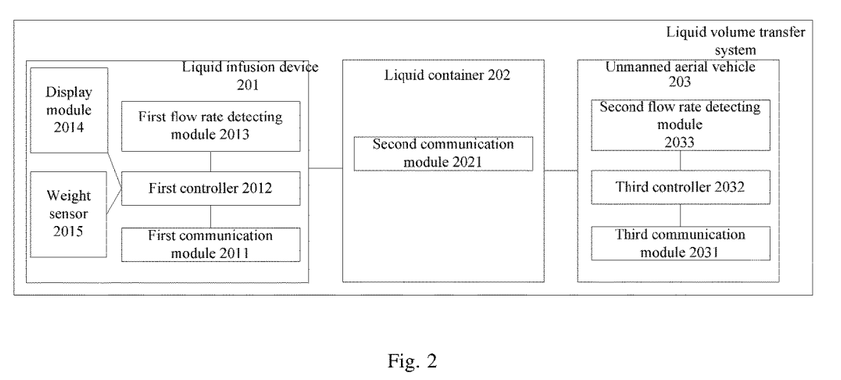
FIG. 2 is a structure chart of a liquid volume transfer system according to an embodiment of the present disclosure.

Referring to FIG. 2, a structure chart of a liquid volume transfer system according to another embodiment of the present disclosure is shown.

The liquid volume transfer system according to this embodiment of the present disclosure includes: a liquid infusion device 201, a liquid container 202 and an unmanned aerial vehicle 203.

The liquid infusion device 201 includes a first communication module 2011, a first controller 2012 and a first flow rate detecting module 2013, a display module 2014, and a weight sensor 2015; the liquid container 202 includes a second communication module 2021; the unmanned aerial vehicle 203 includes a third communication module 2031, a third controller 2032 and a second flow rate detecting module 2033.

When the liquid container is infused with liquid, the first controller 2012 can obtain the remaining liquid volume value from the second communication module 2021 through the first communication module 2011. The first controller 2012 can control the display module 2014 to display the remaining liquid volume value after acquisition of the remaining liquid volume value. The first controller 2012 can determine a target infused liquid volume value based on the remaining liquid volume value and a total infused liquid volume value after receiving a confirmation instruction through the display module 2014.

The liquid infusion device is provided with the display module therein, and an execution logic of the first controller 2012 is configured as a preferable embodiment in which after the confirmation instruction is received from the user, the operation of determining the target infused liquid volume value is executed subsequently, such that it is possible to avoid the problem that the determined target infusion liquid value is erroneous in the case where the liquids infused in two infusion operations are different.

If the liquids infused in the two infusion operations are different, the staff needs to evacuate the remaining liquid in the liquid container after completing the previous operation. Because the display module displays the remaining liquid volume value in the liquid container, when the type of liquid infused varies in the next operation, it is possible to remind the staff of the presence of the remaining liquid in the liquid container and prompt the staff in time to modify the remaining liquid volume value into 0, so as to guarantee the accuracy of liquid infusion. Certainly, if the liquids in the two infusion operations are the same, the staff does not need to modify the remaining liquid volume value, and instead directly sends the confirmation instruction to the first controller through the display module.

For example, if the total infused liquid volume value is set to 5 liters, the remaining liquid volume value in the liquid container detected after the previous operation is 1.7 liters. For the next operation, the staff evacuates the liquid in the liquid container because the liquids in the two infusion operations are different; if the display module does not display the actual remaining liquid volume value, the first controller automatically determines the target infused liquid volume value without the need for the staff to manually confirm execution of the subsequent steps, and hence the target infused liquid volume value determined is 3.3 liters, i.e. finally the total liquid volume in the liquid container is 3.3 liters. However, the total liquid volume required for this infusion operation is actually supposed to reach 5 liters, which leads to the problem that the infused liquid volume is not accurate.

However, if the remaining liquid volume value is displayed by the display module, it is possible to prompt the user to modify the remaining liquid volume value. In a case where the staff evacuates the liquid in the liquid container, the staff renews the remaining liquid volume value obtained by the first controller to 0 correspondingly; after the renewal of the value, the confirmation instruction can be sent to the first controller through the display module; and the first controller can determine the target infused liquid volume value based on the renewed remaining liquid volume value and the total infused liquid volume value. Since the remaining liquid volume value is 0 and the total infused liquid volume value is 5 liters, the determined target infused liquid volume value is 5 liters, and hence the total liquid volume in the liquid container after the infusion may reach 5 liters.

In this embodiment, the liquid infusion device 201 is further provided with the weight sensor 2015, through which the actual weight of the liquid container can be measured, and then the accuracy of the remaining liquid volume value is judged according to the actual weight. Preferably, the way of determining the target infused liquid volume value based on the remaining liquid volume value and the total infused liquid volume value by the first controller 2012 is that the first controller 2012 can judge the validity of the remaining liquid volume value, and if the remaining liquid volume value is confirmed to be valid, then the remaining liquid volume value can be corrected; a feasible specific way is as follows.

When the liquid container 202 is in contact with the weight sensor 2015 of the liquid infusion device 201, the weight sensor 2015 can sense a first weight of the liquid container at present; the first controller 2012 can obtain the first weight, a net weight of the liquid container and a density of the liquid, and determine a second weight of the liquid container at present based on the obtained remaining liquid volume value, the net weight of the liquid container and the density of the liquid; the first controller 2012 can determine whether the remaining liquid volume value is valid according to the first weight and the second weight, if valid, then the remaining liquid volume value can be corrected, and the target infused liquid volume value can be determined based on the corrected remaining liquid volume value and the total infused liquid volume value.

In the case where the first controller 2012 determines whether the remaining liquid volume value is valid according to the first weight and the second weight, if a difference between the first weight and the second weight is within a preset range, the remaining liquid volume value is determined to be valid, but if the difference between the both goes beyond the preset range, the remaining liquid volume value is determined to be invalid. In this embodiment, when the remaining liquid volume value is invalid, there may be a problem with the communication between the communication modules, i.e. failing to renew the remaining liquid volume value in time, or a problem with the weight sensor. Thus, the judgment on data validity may not only inform the staff in time of any occurrence of problems in the modules of the system, but also try to prevent the invalid data from affecting the accuracy of infusion.

When the remaining liquid volume value is corrected, the first weight and the second weight may be averaged, and an average value is regarded as a corrected value of the current weight of the liquid container; a weight value of the remaining liquid is obtained by subtracting the net weight of the liquid container from the resulting average value, and finally the weight value of the remaining liquid is divided by the density of the liquid to obtain the corrected remaining liquid volume value. It is also possible to determine the corrected value of the current weight of the liquid container based on the first weight, the second weight and respective proportions of the both. Also, the first weight may be directly regarded as the corrected value of the current weight of the liquid container. The above only lists a few specific amendments to the remaining liquid volume value, and it is possible for those skilled in the art to provide any feasible solutions according to practical requirements in the specific implementation process, which will not be elaborated in the embodiments of the present disclosure.

It should be noted that those skilled in the art may decide whether to install the display module and the weight sensor according to practical requirements in the actual implementation process. Certainly, it is possible to install either of the display module and the weight sensor.

The first controller 2012 can control the liquid infusion device starts the operation of infusing the liquid into the liquid container, upon the determination of the target infused liquid volume value.

In the process of infusing liquid into the liquid container, the first controller 2012 can receive a first flow rate signal output by the first flow rate detecting module 2013, and calculate a liquid volume infused into the liquid container according to the first flow rate signal. The first flow rate signal can reflect a flow rate of liquid per unit time, and the liquid volume infused into the liquid container may be determined based on the flow rate of liquid per unit time and the infusion time. When the liquid volume infused into the liquid container 202 reaches the target infused liquid volume value, the liquid infusion operation can be stopped.

The first controller 2012 can send the total infused liquid volume value to the second communication module 2021 through the first communication module 2011. The second communication module can receive the total infused liquid volume value sent by the first communication module and stores the total infused liquid volume value.

When the liquid container 202 is combined with the unmanned aerial vehicle 203, that is, when the liquid container 102 is placed at a predetermined position of the unmanned aerial vehicle 103, the third controller 2032 provided in the unmanned aerial vehicle 203 can obtain the total infused liquid volume value from the second communication module 2021 through the third communication module 2031.

After acquisition of the total infused liquid volume value, the third controller 2032 can control a liquid spraying component to spray the liquid, and the second flow rate detecting module 2033 can output a second flow rate signal in real time in a liquid spraying process. The third controller 2032 can receive the second flow rate signal output by the second flow rate detecting module in real time, and the sprayed liquid volume value can be determined according to the received second flow rate signal after the completion of spraying.

The second flow rate signal can reflect a flow rate of liquid per unit time, and the sprayed liquid volume value during this operation may be determined based on the flow rate of liquid per unit time and the total time of liquid spraying.

The third controller 2032 can determine the remaining liquid volume value based on the total infused liquid volume value and the sprayed liquid volume value, and send the remaining liquid volume value to the second communication module 2021 through the third communication module 2031; the second communication module 2021 can receive the remaining liquid volume value sent by the third communication module 2031, such that before the next operation, the liquid infusion device may obtain the remaining liquid volume value in the liquid container during this operation from the second communication module 2021.

It should be noted that during practical applications, those skilled in the art may choose the type of the respective communication modules based on practical requirements. For example, the first communication module and third communication module each are configured as a near field communication (NFC) card reader, and the second communication module is configured as an NFC tag matching the NFC card reader. For another example, the first communication module and third communication module each are configured as a Bluetooth wireless transceiver, and the second communication module is configured as an apparatus including a memory, a second controller and a Bluetooth wireless transceiver.

Besides the beneficial effects of the liquid volume transfer system in the above embodiment, the liquid volume transfer system provided in this embodiment further has the following effects. First, the liquid infusion device is provided with the display module therein, and the remaining liquid volume value is displayed by the display module, such that it is possible to avoid the problem that the determined target infusion liquid value is erroneous in the case where the liquids infused in the two operations are different. Second, the liquid infusion device is provided with the weight sensor therein, and the actual weight of the liquid container is measured by the weight sensor; then, the validity of the remaining liquid volume value is judged according to the actual weight, and if it is valid, the remaining liquid volume value is corrected to improve the accuracy of the remaining liquid volume value, so as to improve the accuracy of infusing the liquid container.

Figure 3:
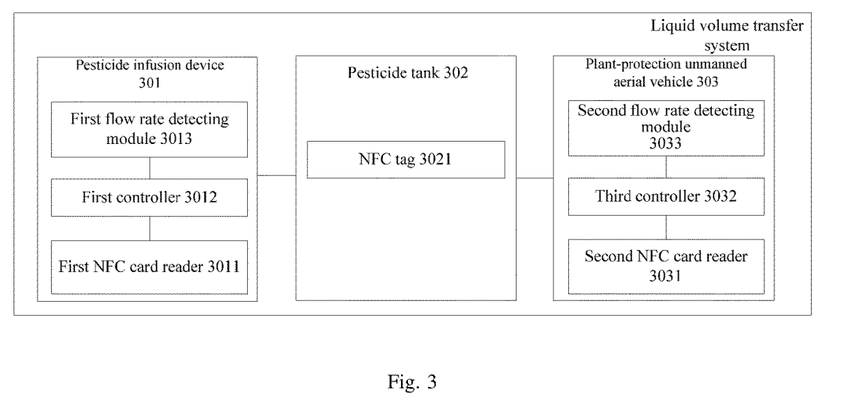
FIG. 3 is a structure chart of a liquid volume transfer system according to an embodiment of the present disclosure.

Referring to FIG. 3, a structure chart of a liquid volume transfer system according to an embodiment of the present disclosure is shown.

In this embodiment, for example, the liquid infusion device is a pesticide infusion device, the liquid container is a pesticide tank, the unmanned aerial vehicle is a plant-protection unmanned aerial vehicle, the first communication module and the third communication module each are configured as an NFC card reader, and the second communication module is configured as an NFC tag matching the NFC card reader, so as to elaborate the liquid volume transfer system in this embodiment.

The NFC card reader is a contactless smart card reading or writing device that may read or write NFC data. The NFC tag is an information tag capable of reading and rewriting, and is a passive device that requires no power source. The pesticide infusion device (like a pesticide infusion machine) is a liquid infusion device, and is mainly used for accurate pesticide liquid infusion of the plant-protection unmanned aerial vehicle.

The liquid volume transfer system in this embodiment is implemented based on the NFC technology.

As shown in FIG. 3, the liquid volume transfer system in this embodiment includes: a pesticide infusion device 301, a pesticide tank 302, and a plant-protection unmanned aerial vehicle 303. The pesticide infusion device 301 includes a first NFC card reader 3011, a first controller 3012 and a first flow rate detecting module 3013; the pesticide tank 302 includes an NFC tag 3021; the plant-protection unmanned aerial vehicle 303 includes a second NFC card reader 3031, a third controller 3032 and a second flow rate detecting module 3033.

When the pesticide infusion device 301 starts a pesticide infusion process, the first controller 3012 can read the remaining liquid volume value from the NFC tag in the pesticide tank 302 through a data port of the first NFC card reader. The first controller 3012 can determine the target infused liquid volume value based on the remaining liquid volume value and the total infused liquid volume value.

After the determination of the target infused liquid volume value, the pesticide can be infused into the pesticide tank 302. In the pesticide infusion process, the first flow rate detecting module 3013 can output a first flow rate signal; the first controller 3012 can receive the first flow rate signal reflecting the infused pesticide volume this time output by the first flow rate detecting module 3013; the infused pesticide volume infused into the pesticide tank 302 can be calculated according to the first flow rate signal; when the infused pesticide volume reaches the target infused liquid volume value, the pesticide infusion into the pesticide tank 302 can be stopped. The first controller 3012 can write the total infused liquid volume value into the NFC tag 3021 via the data port of the first NFC card reader by the NFC technology, and the NFC tag 3021 can store the received total infused liquid volume value.

After the pesticide tank 302 is mounted into the plant-protection unmanned aerial vehicle 303, the third controller 3032 can obtain the total infused liquid volume value from the NFC tag 3021 through the second NFC card reader 3031, and the second NFC card reader 3031 cab obtain the total infused liquid volume value in the NFC tag by the NFC technology and transmit the total infused liquid volume value to the third controller 3032 of the plant-protection unmanned aerial vehicle 303.

After the plant-protection unmanned aerial vehicle 303 obtains the total infused liquid volume value, a spraying process can be started according to the user control. In the spraying process, the second flow rate detecting module 3033 can output a real-time flow rate value to the third controller 3032, and the third controller 3032 can calculate the pesticide volume value sprayed by the plant-protection unmanned aerial vehicle based on the real-time flow rate value. Thus, after the spraying process is completed, the third controller 3032 may calculate the sprayed pesticide volume value this time, and the remaining pesticide volume value may be obtained by subtracting the sprayed pesticide volume value from the total infused liquid volume value. The third controller 3032 may write the remaining pesticide volume value into the NFC tag 3021 through the data port of the second NFC card reader 3011, and in turn the NFC tag 3021 can renew the stored total infused liquid volume value by using the received remaining pesticide volume value, so as to facilitate acquisition by the pesticide infusion device next time the pesticide is infused into the pesticide tank.

For the liquid volume transfer system according to the embodiment of the present disclosure, the pesticide infusion device, the pesticide tank and the plant-protection unmanned aerial vehicle are each provided with a communication module, and the total infused liquid volume value actually infused into the pesticide tank is transmitted to the third controller through the communication among the three communication modules; after the completion of this operation, the third controller determines the remaining liquid volume value based on the total infused liquid volume value and the actually sprayed liquid volume value during the operation, and sends the remaining liquid volume value or the remaining pesticide information back to the pesticide infusion device through the communication among the three communication modules. After the pesticide infusion device obtains the remaining liquid volume value, the target infused liquid volume value may be automatically determined based on the remaining liquid volume value, and the liquid infusion operation may be executed under automatic control according to the target infused liquid volume value, so as to achieve the purpose of automatic and accurate liquid infusion, thereby improving the operation efficiency.

Figure 4:
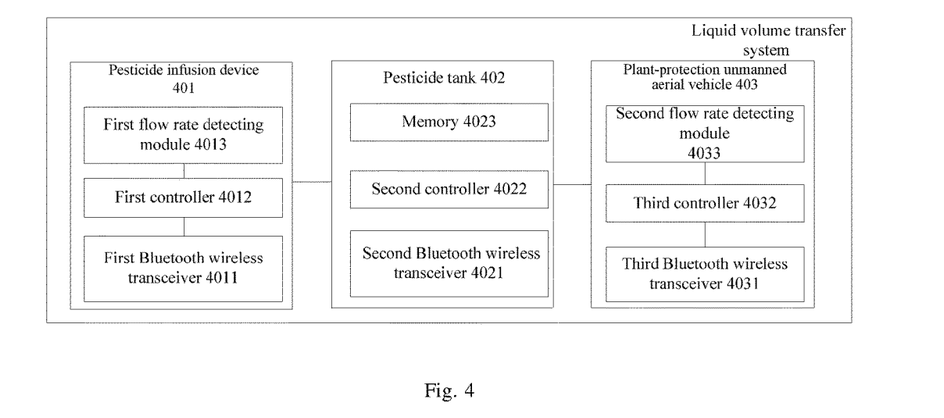
FIG. 4 is a structure chart of a liquid volume transfer system according to an embodiment of the present disclosure.

Referring to FIG. 4, a structure chart of a liquid volume transfer system according to an embodiment of the present disclosure is shown.

In this embodiment, for example, the liquid infusion device is a pesticide infusion device, the liquid container is a pesticide tank, the unmanned aerial vehicle is a plant-protection unmanned aerial vehicle, the first communication module and the third communication module each are configured as a Bluetooth wireless transceiver, and the second communication module is configured as an apparatus including a memory, a second controller and a Bluetooth wireless transceiver, so as to elaborate the liquid volume transfer system in this embodiment.

As shown in FIG. 4, the liquid volume transfer system according to the embodiment of the present disclosure includes a pesticide infusion device 401, a pesticide tank 402, and a plant-protection unmanned aerial vehicle 403. The pesticide infusion device 401 includes a first Bluetooth wireless transceiver 4011, a first controller 4012 and a first flow rate detecting module 4013; the pesticide tank 402 includes a second Bluetooth wireless transceiver 4021, a second controller 4022 and a memory 4023; the plant-protection unmanned aerial vehicle 403 includes a third Bluetooth wireless transceiver 4031, a third controller 4032 and a second flow rate detecting module 4033.

When the pesticide infusion device 401 starts a pesticide infusion process, the first controller 4012 can interact with the second Bluetooth wireless transceiver 4021 in the pesticide tank 402 by a Bluetooth communication technology through the first Bluetooth wireless transceiver 4011 to obtain the remaining liquid volume value. The second Bluetooth wireless transceiver 4021 can read the remaining liquid volume value from the memory through the second controller 4022.

The first controller 4012 can determine the target infused liquid volume value based on the remaining liquid volume value and the total infused liquid volume value. After the determination of the target infused liquid volume value, the pesticide can by infused into the pesticide tank 402. In the pesticide infusion process, the first flow rate detecting module 4013 can output a first flow rate signal; the first controller 4012 can receive the first flow rate signal reflecting the infused pesticide volume this time output by the first flow rate detecting module 4013; the first controller 4012 can calculate the infused pesticide volume infused into the pesticide tank 402 according to the first flow rate signal; when the infused pesticide volume reaches the target infused liquid volume value, the pesticide infusion into the pesticide tank 402 can be stopped.

The first controller 4012 can send the total infused liquid volume value to the second Bluetooth wireless transceiver 4021 by the Bluetooth communication technology through the first Bluetooth wireless transceiver 4011. The second controller 4022 can obtain the total infused liquid volume value from the second Bluetooth wireless transceiver 4021, and stores the total infused liquid volume value in the memory 4023. It should be noted that the memory 4023 may be provided within the second controller 4022, or may be provided separately from the second controller 4022.

After the pesticide tank 402 is mounted into the plant-protection unmanned aerial vehicle 403, the second controller 4022 can control the second Bluetooth wireless transceiver 4021 to transmit the stored total infused liquid volume value to the third Bluetooth wireless transceiver 4031 by the Bluetooth communication technology. Specifically, the second controller 4022 can obtain the total infused liquid volume value from the memory, and send the total infused liquid volume value to the second Bluetooth wireless transceiver 4021; the second Bluetooth wireless transceiver 4021 can send the total infused liquid volume value to the third Bluetooth wireless transceiver 4031 by the Bluetooth communication technology. The third Bluetooth wireless transceiver 4031 can obtain the total infused liquid volume value, and transmit the total infused liquid volume value to the third controller 4032 of the plant-protection unmanned aerial vehicle 403.

After the plant-protection unmanned aerial vehicle 403 obtains the total infused liquid volume value, a spraying process can be started. In the spraying process, the second flow rate detecting module 4033 can output a real-time flow rate value to the third controller 4032, and the third controller 4032 can calculate the pesticide volume value sprayed by the plant-protection unmanned aerial vehicle based on the real-time flow rate value. Thus, after the spraying process is completed, the third controller 4032 may calculate the sprayed pesticide volume value this time, and the remaining pesticide volume value may be obtained by subtracting the sprayed pesticide volume value from the total infused liquid volume value. The third controller 4032 can control the third Bluetooth wireless transceiver 4031 to send the remaining pesticide volume value into the second Bluetooth wireless transceiver 4021; the second controller 4022 can obtain the remaining pesticide volume value from the second Bluetooth wireless transceiver 4021, erases the total infused liquid volume value stored in the memory, and store the obtained remaining pesticide volume value to the memory, so as to facilitate acquisition by the pesticide infusion device next time the pesticide is infused into the pesticide tank.

For the liquid volume transfer system according to the embodiments of the present disclosure, the pesticide infusion device, the pesticide tank and the plant-protection unmanned aerial vehicle are each provided with a communication module, and the total infused liquid volume value actually infused into the pesticide tank is transmitted to the third controller through the communication among the three communication modules; after the completion of this operation, the third controller determines the remaining liquid volume value based on the total infused liquid volume value and the actually sprayed liquid volume value during the operation, and sends the remaining liquid volume value or the remaining pesticide information back to the pesticide infusion device through the communication among the three communication modules. After the pesticide infusion device obtains the remaining liquid volume value, the target infused liquid volume value may be determined automatically based on the remaining liquid volume value, and the pesticide infusion operation may be executed under automatic control according to the target infused liquid volume value, so as to achieve the purpose of automatic and accurate liquid infusion, thereby improving the operation efficiency.

Figure 5:
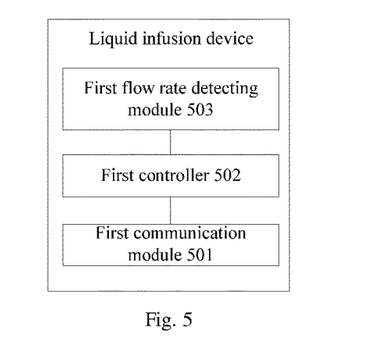
FIG. 5 is a structure chart of a liquid infusion device according to an embodiment of the present disclosure.

Referring to FIG. 5, a structure chart of a liquid infusion device according to an embodiment of the present disclosure is shown.

As shown in FIG. 5, the liquid infusion device according to this embodiment of the present disclosure includes: a first communication module 501, a first controller 502 and a first flow rate detecting module 503.

The first communication module may be any suitable communication module, such as an NFC card reader or a Bluetooth wireless transceiver.

When the liquid infusion operation is performed on the liquid container, the first controller 502 can obtain the remaining liquid volume value from the second communication module in the liquid container through the first communication module 501, and determine the target infused liquid volume value based on the remaining liquid volume value and the total infused liquid volume value. Upon the determination of the target infused liquid volume value, the first controller 502 may start the liquid infusion operation to the liquid container.

In the process of infusing the liquid into the liquid container, the first controller 502 can receive a first flow rate signal output by the first flow rate detecting module 503, and calculate the liquid volume infused into the liquid container based on the first flow rate signal. The first flow rate signal can reflect a flow rate of liquid per unit time, and the liquid volume infused into the liquid container may be determined based on the flow rate of liquid per unit time and the infusion time. When the liquid volume infused into the liquid container reaches the target infused liquid volume value, the liquid infusion operation can be stopped.

The first controller 502 can send the total infused liquid volume value to the second communication module in the liquid container through the first communication module 501, such that the second communication module may receive and store the total infused liquid volume value.

Since the total infused liquid volume value is stored in the second communication module in the liquid container, when the liquid container is mounted to the unmanned aerial vehicle, the third controller of the unmanned aerial vehicle may obtain the total infused liquid volume value from the second communication module. After the liquid spraying is completed, the third controller in the unmanned aerial vehicle can determine the total sprayed liquid volume value this time, determine the remaining liquid volume value in the liquid container based on the total infused liquid volume and the sprayed liquid volume, and transmit the remaining liquid volume value to the second communication module through the communication module, so as to facilitate acquisition by the liquid infusion device during the liquid infusion next time.

In another embodiment, the liquid infusion device may be provided with a display module. After acquisition of the remaining liquid volume value, the first controller can control the display module to display the remaining liquid volume value, and after receiving a confirmation instruction through the display module, the first controller can determine the target infused liquid volume value based on the remaining liquid volume value and the total infused liquid volume value.

As for the function and effect of the display module provided in the liquid infusion device, reference may be made to relevant description of the above embodiment, which will not be elaborated herein.

In another embodiment, the liquid infusion device may be further provided with a weight sensor. The weight sensor can sense the first weight of the liquid container at present; the first controller can obtain the first weight, and determine a second weight of the liquid container at present based on the obtained remaining liquid volume value, the net weight of the liquid container and the density of the liquid; the first controller can determine whether the remaining liquid volume value is valid according to the first weight and the second weight, if valid, then the remaining liquid volume value can be corrected.

As for the function and effect of the weight sensor provided in the liquid infusion device, and the specific way of correcting the remaining liquid volume value, reference may be made to relevant description of the above embodiment, which will not be elaborated herein.

For the liquid infusion device according to the embodiment of the present disclosure, the liquid infusion device is provided with the communication module that is able to obtain the remaining liquid volume value in the liquid container; after the liquid infusion device obtains the remaining liquid volume value, the target infused liquid volume value may be determined automatically based on the remaining liquid volume value, and the liquid infusion operation is executed under automatic control according to the target infused liquid volume value, so as to achieve the purpose of automatic and accurate liquid infusion, thereby improving the operation efficiency.

Figure 6:
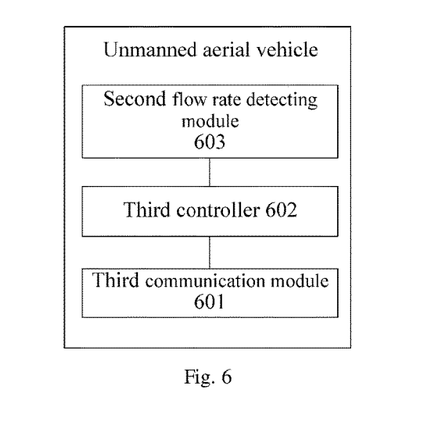
FIG. 6 is a structure chart of an unmanned aerial vehicle according to an embodiment of the present disclosure.

Referring to FIG. 6, a structure chart of an unmanned aerial vehicle according to an embodiment of the present disclosure is shown.

As shown in FIG. 6, the unmanned aerial vehicle according to this embodiment of the present disclosure includes: a third communication module 601, a third controller 602 and a second flow rate detecting module 603.

The third communication module may be any suitable communication module, such as an NFC card reader or a Bluetooth wireless transceiver.

When the liquid container is combined with the unmanned aerial vehicle, that is, when the liquid container 102 is placed at a predetermined position of the unmanned aerial vehicle 103, the third controller 602 provided in the unmanned aerial vehicle can obtain the total infused liquid volume value from the second communication module provided in the liquid container through the third communication module 601.

After acquisition of the total infused liquid volume value, the third controller 602 can control a liquid spraying component to spray the liquid, and the second flow rate detecting module 603 can generate a second flow rate signal according to a spray flow rate in a liquid spraying process and output the second flow rate signal in real time. The third controller 602 can receive the second flow rate signal output by the second flow rate detecting module 603 in real time, and determine the sprayed liquid volume value according to the received second flow rate signal after the completion of spraying. The second flow rate signal can reflect a flow rate of liquid per unit time, and the sprayed liquid volume value during this operation may be determined based on the flow rate of liquid per unit time and the total time of liquid spraying.

The third controller 602 can determine the remaining liquid volume value based on the total infused liquid volume value and the sprayed liquid volume value, and send the remaining liquid volume value to the second communication module in the liquid container through the third communication module 601, such that before the next operation, the liquid infusion device may obtain the remaining liquid volume value in the liquid container during this operation from the second communication module.

For the unmanned aerial vehicle according to the embodiment of the present disclosure, the unmanned aerial vehicle is provided with the communication module, through which the unmanned aerial vehicle communicates with the communication module in the liquid container; the third controller obtains the total infused liquid volume value actually infused into the liquid container through the communication module; after this operation is completed, the third controller determines the remaining liquid volume value based on the total infused liquid volume value and the actually sprayed liquid volume value during this operation, and sends the remaining liquid volume value or the remaining pesticide volume information back to the communication module in liquid infusion device through the communication among the communication modules. When the liquid infusion device performs the liquid infusion operation on the liquid container, the liquid infusion device obtains the remaining liquid volume value from the communication module in the liquid container. After the liquid infusion device obtains the remaining liquid volume value, the target infused liquid volume value may be determined automatically based on the remaining liquid volume value, and the liquid infusion operation may be executed under automatic control based on the target infused liquid volume value, so as to achieve the purpose of automatic and accurate liquid infusion, thereby improving the operation efficiency.

Figure 7:
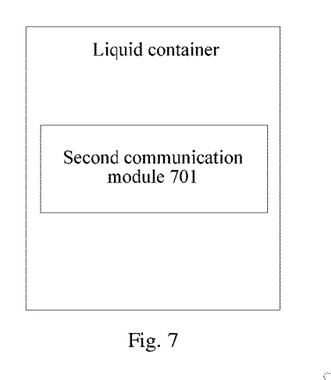
FIG. 7 is a structure chart of a liquid container according to an embodiment of the present disclosure.

Referring to FIG. 7, a structure chart of a liquid container according to an embodiment of the present disclosure is shown.

As shown in FIG. 7, the liquid container according to this embodiment of the present disclosure includes a second communication module 701.

The second communication module may be any suitable communication module, for example, an NFC tag matching an NFC card reader, and may be a communication module including a memory, a second controller and a Bluetooth wireless transceiver.

When the liquid infusion operation is performed on the liquid container, the first controller in the liquid infusion device can obtain the remaining liquid volume value from the second communication module 701 in the liquid container through the first communication module, and the second communication module can send the remaining liquid volume value to the first communication module in the liquid infusion device, such that the first controller may determine the target infused liquid volume value based on the remaining liquid volume value and the total infused liquid volume value.

Upon the completion of the liquid infusion, the first controller can send the total infused liquid volume value to the second communication module 701 through the first communication module, and the second communication module 701 can receive the total infused liquid volume value sent by the first communication module.

When the liquid container is combined with the unmanned aerial vehicle, the third controller provided in the unmanned aerial vehicle can obtain the total infused liquid volume value from the second communication module 701 provided in the liquid container through the third communication module. The second communication module 701 can receive a request sent by the third communication module in the unmanned aerial vehicle for obtaining the total infused liquid volume value, and send the total infused liquid volume value to the third communication module. In such a way, the unmanned aerial vehicle may determine the remaining liquid volume value in the liquid container based on the total infused liquid volume value and the sprayed liquid volume value in this spraying process. As for the specific solutions of determining the remaining liquid volume value, reference may be made to the relevant description of the above embodiment, which will not be elaborated herein.

After the liquid spraying is completed, the third controller in the unmanned aerial vehicle can send the remaining liquid volume value to the second communication module 701 through the third communication module, and the second communication module can receive the remaining liquid volume value sent by the third communication module, such that before the next operation, the liquid infusion device may obtain the remaining liquid volume value in the liquid container during this operation from the second communication module.

For the liquid container according to the embodiment of the present disclosure, the liquid container is provided with the communication module, through which the liquid container communicates with the communication modules in the liquid infusion device and the unmanned aerial vehicle, and the total infused liquid volume value actually infused into the liquid container is transmitted to the third controller; after this operation is completed, the third controller determines the remaining liquid volume value based on the total infused liquid volume value and the actually sprayed liquid volume value during this operation, and sends the remaining liquid volume value or the remaining pesticide volume information back to the liquid infusion device through the communication among the communication modules. After the liquid infusion device obtains the remaining liquid volume value, the target infused liquid volume value may be determined automatically based on the remaining liquid volume value, and the liquid infusion operation may be executed under automatic control based on the target infused liquid volume value, so as to achieve the purpose of automatic and accurate liquid infusion, thereby improving the operation efficiency.

Figure 8:
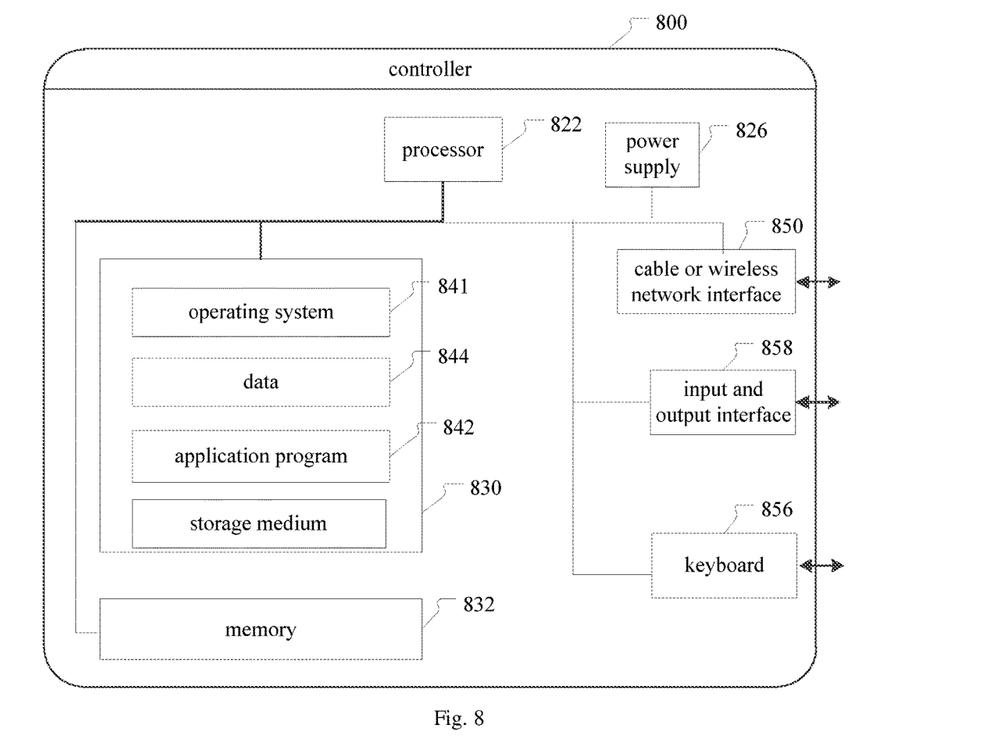
FIG. 8 is a schematic structural view of a controller according embodiments of the present disclosure.

FIG. 8 is a schematic structural view of a controller according embodiments of the present disclosure. The controller 800 may vary considerably depending on configuration or performance and may include one or more processors (central processing units, CPU) 822 and memories 832, one or more storage mediums 830 storing application programs 842 or data 844 Medium 830 (e.g., one or more mass storage devices). In which the memory 832 and the storage medium 830 may be short-lived or persistent. The program stored in the storage medium 830 may include one or more modules (not shown), each module may include a series of instruction operations on the controller. Further, the processor 822 may be configured to communicate with the storage medium 830, and a series of instruction operations in the storage medium 830 may be performed on the controller 800, so as to implement all or part of steps of the functions at the above controller side.

The controller 800 may also include one or more power supplies 826, one or more cable or wireless network interfaces 850, one or more input and output interfaces 858, one or more keyboards 856, and/or one or more operating systems 841, such as Windows Server™, Mac OS X™, Unix™, Linux™, Free BS D™, and so on.

In an exemplary embodiment, a non-temporary computer readable storage medium including instructions is further provided, for example, a memory including instructions, the above instructions may be performed on the processor 822 of the controller 800 to implement the above functions. For example, the non-temporary computer readable storage medium may be a read only memory (ROM), a random access memory (RAM), a portable compact disk read-only memory (CDROM), a magnetic tape, a floppy disk, an optical data storage device, and so on.

The controller may refer to the above first controller, the second controller, or the third controller.

Various embodiments in this specification are described in a progressive manner, each of which is primarily described in terms of distinctiveness with respect to other embodiments, and similar parts among the various embodiments may refer to each other.

The liquid volume transfer system provided by the present disclosure has been described above in detail, and the principles and implementations of the present disclosure are illustrated with specific embodiments, but the description of the above embodiments is only for the purpose of understanding the method and the core concept of the present disclosure. Meanwhile, those skilled in the art may make changes to the specific implementations and applications on the basis of the concept of the present disclosure. In conclusion, the contents of this specification should not be construed to limit the present disclosure.

The liquid volume transfer system provided here is not inherently related to any particular computer, virtual system, or other device. Various systems for general purposes can also be used with teachings herein. Based on the above description, it is obviously attainable to construct a structure required by the system according to the scheme of the present disclosure. Additionally, the present disclosure is not directed to any particular programming language. It should be understood that the contents of the present disclosure may be implemented in a variety of programming languages and the above description of particular languages is intended to reveal preferred embodiments of the present disclosure.

A number of specific details are set forth in the specification provided herein. However, it should be understood that embodiments of the present disclosure may be practiced without these specific details. In some examples, well-known methods, structures, and techniques have not been shown in detail so as not to obscure the understanding of the specification.

Similarly, it should be understood that in order to simplify the disclosure and assist in understanding one or more of the various inventive aspects, each of the features of the present disclosure is sometimes grouped together into a single embodiment, a single figure or the description thereof, in the description of the exemplary embodiments of the present disclosure. However, the method of the present disclosure should not be interpreted as reflecting the following intention: The claimed invention requires more features than those explicitly recited in each of the claims. More specifically, as reflected in the claims, the inventive aspect includes features less than all the features of the previously disclosed individual embodiments. Accordingly, the claims that follow the particular embodiments are explicitly incorporated into the particular embodiments, in which each claim is regarded as a separate embodiment of the present disclosure.

It should be understood by those skilled in the art that modules of the devices in an embodiment may be adaptively changed and provided in one or more devices that are different from the embodiment. The modules or units or components in the embodiments may be combined into one module or unit or component, and in addition they may be divided into sub-modules or sub-units or sub-components. Except the fact that at least some of the features and/or processes or units are mutually exclusive, all features disclosed in this specification (including the accompanying claims, abstract and drawings) as well as any process or unit of any method or apparatus so disclosed can be combined in any manner. Unless specified or limited otherwise, each feature disclosed in this specification (including the accompanying claims, abstract and drawings) may be replaced with an alternative feature for the same, equivalent or similar purpose.

In addition, it could be understood by those skilled in the art that some of the embodiments described herein include certain features in other embodiments rather than different features, but combinations of the features of different embodiments are intended to fall into the scope of the present disclosure and form different embodiments. For example, in the claims, any one of the claimed embodiments may be used in any combination.

Various component embodiments of the present disclosure may be realized by hardware, or software modules running on one or more processors, or combinations thereof. It should be understood by those skilled in the art that a microprocessor or a digital signal processor (DSP) may be utilized in practice to implement some or all of the functions of some or all of the components in the liquid volume transfer system according to embodiments of the present disclosure. The present disclosure may also be realized as apparatuses or device programs (e.g., computer programs and computer program products) for executing a part or all of the methods described herein. Such a program for implementing the present disclosure may be stored in a computer-readable medium, or may be in the form of one or more signals. Such signals may be downloaded from Internet website, or provided by a carrier signal or in any other form.

It should be noted that the foregoing embodiments only illustrate the present disclosure and are not intended to limit the present disclosure, and those skilled in the art may devise alternative embodiments without departing from the scope of the appended claims. In the claims, any reference signs in parentheses should not be construed to limit the claims. The term "comprising" does not exclude other elements or steps that are not listed in the claims. An expression "a" or "an" before the element does not exclude the presence of a plurality of such elements. The present disclosure may be realized by means of hardware including several different elements and by means of a suitably programmed computer. In the unit claims that enumerate several devices, several of these devices may be embodied by the same hardware item. Terms such as "first," "second" and "third" are not intended to indicate any sequence, and may be interpreted as names.

What is claimed is:

1. A liquid volume transfer system, comprising:
a liquid infusion device, comprising a first communication module, a first controller and a first flow rate detecting module;
a liquid container, comprising a second communication module; and
an unmanned aerial vehicle, comprising a third communication module, a third controller and a second flow rate detecting module,
wherein the first controller obtains a remaining liquid volume value within the liquid container from the second communication module through the first communication module, and determines a target infused liquid volume value based on the remaining liquid volume value and a total infused liquid volume value;
the first controller receives a first flow rate signal output by the first flow rate detecting module, calculates a liquid volume infused into the liquid container according to the first flow rate signal, stops a liquid infusion operation when the liquid volume infused into the liquid container reaches the target infused liquid volume value, and sends the total infused liquid volume value to the second communication module through the first communication module;
the second communication module receives the total infused liquid volume value sent by the first communication module;
the third controller obtains the total infused liquid volume value from the second communication module through the third communication module, receives a second flow rate signal output by the second flow rate detecting module in real time, and determines a sprayed liquid volume value according to the received second flow rate signal after completion of a spraying operation from the liquid container by the unmanned aerial vehicle; the third controller determines the remaining liquid volume value based on the total infused liquid volume value and the sprayed liquid volume value, and sends the remaining liquid volume value to the second communication module through the third communication module; the second communication module receives the remaining liquid volume value sent by the third communication module.

2. The system according to claim 1, wherein the liquid infusion device further comprises a display module;
the first controller controls the display module to display the remaining liquid volume value after acquisition of the remaining liquid volume value; the first controller determines the target infused liquid volume value based on the remaining liquid volume value and the total infused liquid volume value after receiving a confirmation instruction through the display module.

3. The system according to claim 1, wherein the liquid infusion device further comprises a weight sensor;
the weigh sensor senses a first weight of the liquid container at present;
the first controller obtains the first weight, a net weight of the liquid container and a density of the liquid, and determines a second weight of the liquid container at present based on the obtained remaining liquid volume value, the net weight of the liquid container and the density of the liquid; the first controller determines whether the remaining liquid volume value is valid according to the first weight and the second weight, if valid, the remaining liquid volume value is corrected.

4. The system according to claim 1, wherein the first communication module and third communication module each are configured as a near field communication (NFC) card reader, and the second communication module is configured as an NFC tag matching the NFC card reader.

5. The system according to claim 1, wherein the first communication module and the third communication module each are configured as a Bluetooth wireless transceiver, and the second communication module comprises a memory, a second controller and a Bluetooth wireless transceiver.

6. A liquid infusion device, comprising:
a first communication module, a first controller and a first flow rate detecting module,
wherein when a liquid infusion operation is performed on a liquid container, the first controller obtains a remaining liquid volume value from a second communication module in the liquid container through the first communication module, and determines a target infused liquid volume value based on the remaining liquid volume value and a total infused liquid volume value;
the first controller receives a first flow rate signal output by the first flow rate detecting module, and calculates a liquid volume infused into the liquid container according to the first flow rate signal; when the liquid volume infused into the liquid container reaches the target infused liquid volume value, the liquid infusion operation is stopped; the first controller sends the total infused liquid volume value to the second communication module through the first communication module.

7. The liquid infusion device according to claim 6, further comprising a display module,
wherein the first controller controls the display module to display the remaining liquid volume value after acquisition of the remaining liquid volume value; the first controller determines the target infused liquid volume value based on the remaining liquid volume value and the total infused liquid volume value after receiving a confirmation instruction through the display module.

8. The liquid infusion device according to claim 6, further comprising a weight sensor,
wherein the weigh sensor senses a first weight of the liquid container at present;
the first controller obtains the first weight, and determines a second weight of the liquid container at present based on the obtained remaining liquid volume value, a net weight of the liquid container and a density of the liquid; the first controller determines whether the remaining liquid volume value is valid according to the first weight and the second weight, if valid, the remaining liquid volume value is corrected.

9. The liquid infusion device according to claim 8, wherein when the remaining liquid volume value is valid, the first controller corrects the remaining liquid volume value based on the first weight and the second weight.

10. The liquid infusion device according to claim 6, wherein the first communication module is configured as an NFC card reader or a Bluetooth wireless transceiver.

11. A liquid container, comprising:
a second communication module,
wherein the second communication module sends a remaining liquid volume value within the liquid container to a first communication module in a liquid infusion device, such that a first controller in the liquid infusion device may determine a target infused liquid volume value based on the remaining liquid volume value and a total infused liquid volume value;
the second communication module receives the total infused liquid volume value sent by the first communication module;
the second communication module receives a request sent by a third communication module in an unmanned aerial vehicle for obtaining the total infused liquid volume value, and sends the total infused liquid volume value to the third communication module;
the second communication module receives the remaining liquid volume value sent by the third communication module after completion of a spraying operation from the liquid container by the unmanned aerial vehicle.

12. The liquid container according to claim 11, wherein the second communication module is configured as an NFC tag matching an NFC card reader.

13. The liquid container according to claim 11, wherein the second communication module comprises a memory, a second controller and a Bluetooth wireless transceiver.

* * * * *